(12) United States Patent
Eddings (10) Patent No.: US 12,041,913 B2
(45) Date of Patent: Jul. 23, 2024

(54) ELEVATED ANIMAL FEEDER ASSEMBLY

(71) Applicant: Joey Eddings, Monahans, TX (US)

(72) Inventor: Joey Eddings, Monahans, TX (US)

( * ) Notice: Subject to any disclaimer, the term of this patent is extended or adjusted under 35 U.S.C. 154(b) by 33 days.

(21) Appl. No.: 18/087,943

(22) Filed: Dec. 23, 2022

(65) Prior Publication Data

US 2024/0206428 A1    Jun. 27, 2024

(51) Int. Cl.
*A01K 5/02* (2006.01)

(52) U.S. Cl.
CPC .................................. *A01K 5/0258* (2013.01)

(58) Field of Classification Search
CPC ... A01K 5/00; A01K 5/01; A01K 5/02; A01K 5/0258
See application file for complete search history.

(56) References Cited

U.S. PATENT DOCUMENTS

| | | | | |
|---|---|---|---|---|
| 1,108,944 A | * | 9/1914 | Tannenbaum | A01K 5/0258 198/550.6 |
| 1,844,065 A | * | 2/1932 | Heintz | B65G 53/00 406/101 |
| 3,252,562 A | * | 5/1966 | Brembeck | A01K 5/0258 198/550.1 |
| 3,949,863 A | * | 4/1976 | Lippi | B65G 33/24 198/666 |
| 4,003,339 A | * | 1/1977 | Hostetler | A01K 39/0125 119/57.4 |
| D282,367 S | | 1/1986 | Satake | |
| 5,315,958 A | | 5/1994 | Forster | |
| 5,363,805 A | * | 11/1994 | Wing | A01K 5/0291 119/51.11 |
| 5,513,597 A | * | 5/1996 | Pollock | A01K 5/0258 119/57.4 |
| 5,862,777 A | * | 1/1999 | Sweeney | A01K 5/0225 119/57.91 |
| 6,557,598 B2 | * | 5/2003 | Glover | A01K 61/80 406/122 |
| 8,622,660 B1 | | 1/2014 | Gore | |
| 8,800,489 B2 | | 8/2014 | Coxsey | |
| 9,686,965 B2 | | 6/2017 | Norris | |
| 10,810,527 B2 | | 10/2020 | Lauve, IV | |

(Continued)

FOREIGN PATENT DOCUMENTS

| | | | |
|---|---|---|---|
| DE | 102010036512 B3 * | 10/2011 | A01K 39/01 |
| EP | 0503739 A1 * | 9/1992 | |
| WO | WO2018191618 | 10/2018 | |

*Primary Examiner* — Monica L Perry
*Assistant Examiner* — Aaron M Rodziwicz (57) ABSTRACT

An elevated animal feeder assembly includes a hopper for containing granular animal feed. The hopper has a dispensing chute for dispensing the granular animal feed and a plurality of legs for elevating the hopper above a support surface. A feed bucket is suspendable from the hopper facilitating the feed bucket to be filled with the granular animal feed. A pair of grapples is each attached to the feed bucket to suspend the feed bucket from the hopper. An auger chute is disposed in the feed bucket and the auger chute extends into the hopper. An auger is rotatably disposed within the auger chute to transport the granular animal feed upwardly through the auger chute and into the hopper for filling the hopper with the granular animal feed when the auger rotates in a first direction.

9 Claims, 7 Drawing Sheets

(56) References Cited

U.S. PATENT DOCUMENTS

| | | | |
|---|---|---|---|
| 2012/0104032 A1* | 5/2012 | Bahn | B65B 1/12 |
| | | | 222/2 |
| 2014/0224179 A1* | 8/2014 | Mignone | A01K 61/80 |
| | | | 119/57.92 |
| 2015/0272079 A1 | 10/2015 | Evans | |

* cited by examiner

ELEVATED ANIMAL FEEDER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to animal feeder device and more particularly pertains to a new animal feeder device for facilitating a physically limited user to fill an elevated hopper with granular animal feed. The device includes a hopper and legs attached to the hopper for elevating the hopper. An auger is attached to the hopper and a feed bucket is attached to the auger. The feed bucket is suspendable from the hopper such that the feed bucket can be filled with granular animal feed by a physically limited user. The auger transports the granular feed into the hopper when the auger is turned on thereby facilitating the hopper to be filled with the granular material without requiring the physically limited user to manually fill the hopper.

(2) Description of Related Art Including Information Disclosed Under 37 CFR 1.97 and 1.98

The prior art relates to animal feeder devices including a silo filling device that includes a blower which blows grain into a silo. The prior art discloses an animal feed device that includes a hopper with a chute oriented perpendicularly to the hopper, an auger disposed in the chute and a feed trough oriented coaxially with the auger. The prior art discloses an automated filling device that includes a cart mounted feed container with an air blower for blowing feed into an elevated deer feeder. The prior art discloses a game feeder which includes an auger for conveying feed from a hopper to a desired feed location. The prior art discloses a deer feeder device that includes a hopper and a feed dispenser comprising an output tube that branches into a pair of outlets. The prior art discloses an ornamental design of a grain sorter that includes a hopper and a conveyor angling downwardly from the hopper. The prior art discloses an animal feed that includes a hopper and a feeding tube for receiving a measured amount of feed from the hopper.

BRIEF SUMMARY OF THE INVENTION

An embodiment of the disclosure meets the needs presented above by generally comprising a hopper for containing granular animal feed. The hopper has a dispensing chute for dispensing the granular animal feed and a plurality of legs for elevating the hopper above a support surface. A feed bucket is suspendable from the hopper facilitating the feed bucket to be filled with the granular animal feed. A pair of grapples is each attached to the feed bucket to suspend the feed bucket from the hopper. An auger chute is disposed in the feed bucket and the auger chute extends into the hopper. An auger is rotatably disposed within the auger chute to transport the granular animal feed upwardly through the auger chute and into the hopper for filling the hopper with the granular animal feed when the auger rotates in a first direction.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
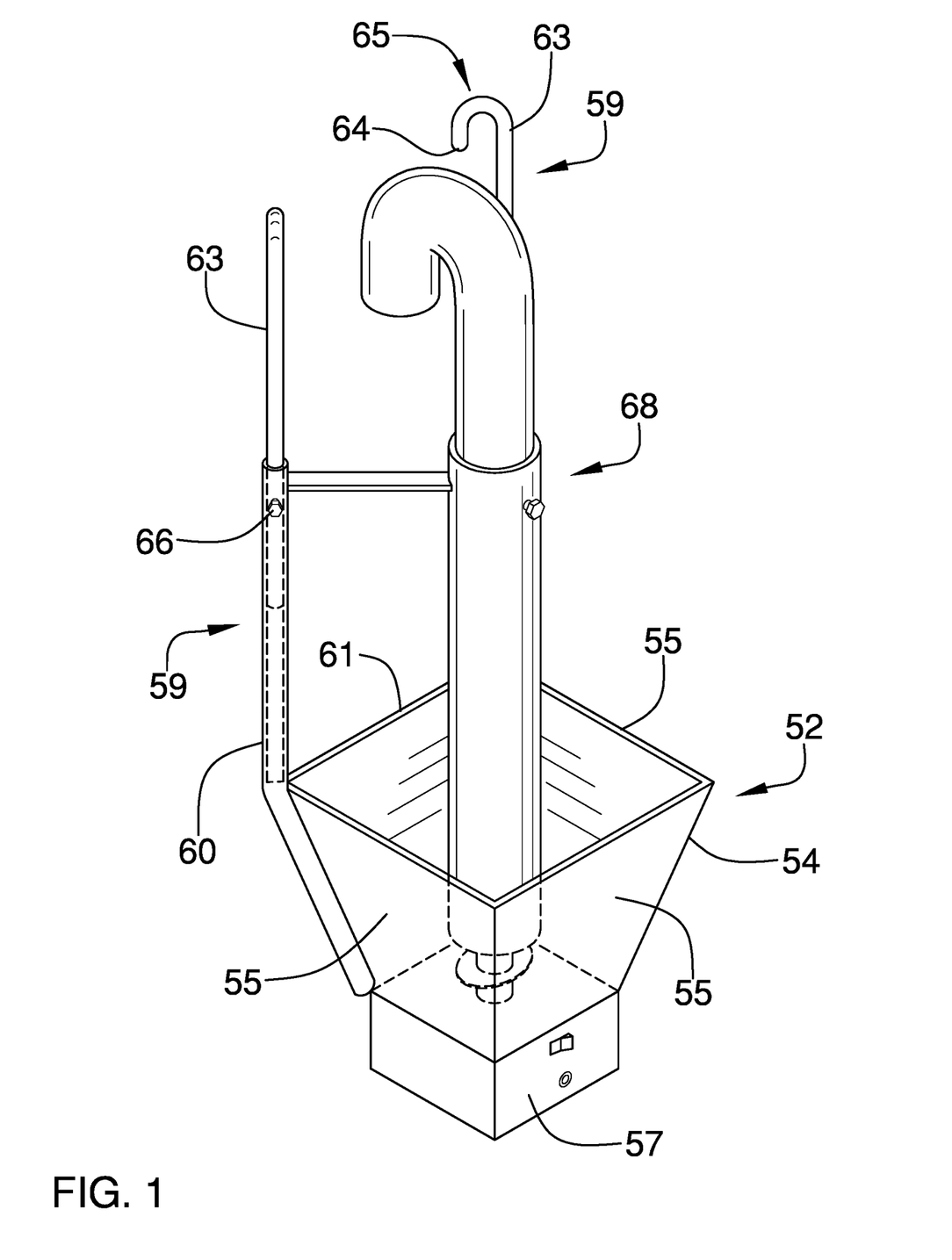
FIG. 1 is a perspective view of a feed bucket and an auger chute of an embodiment of the disclosure.
Figure 2:
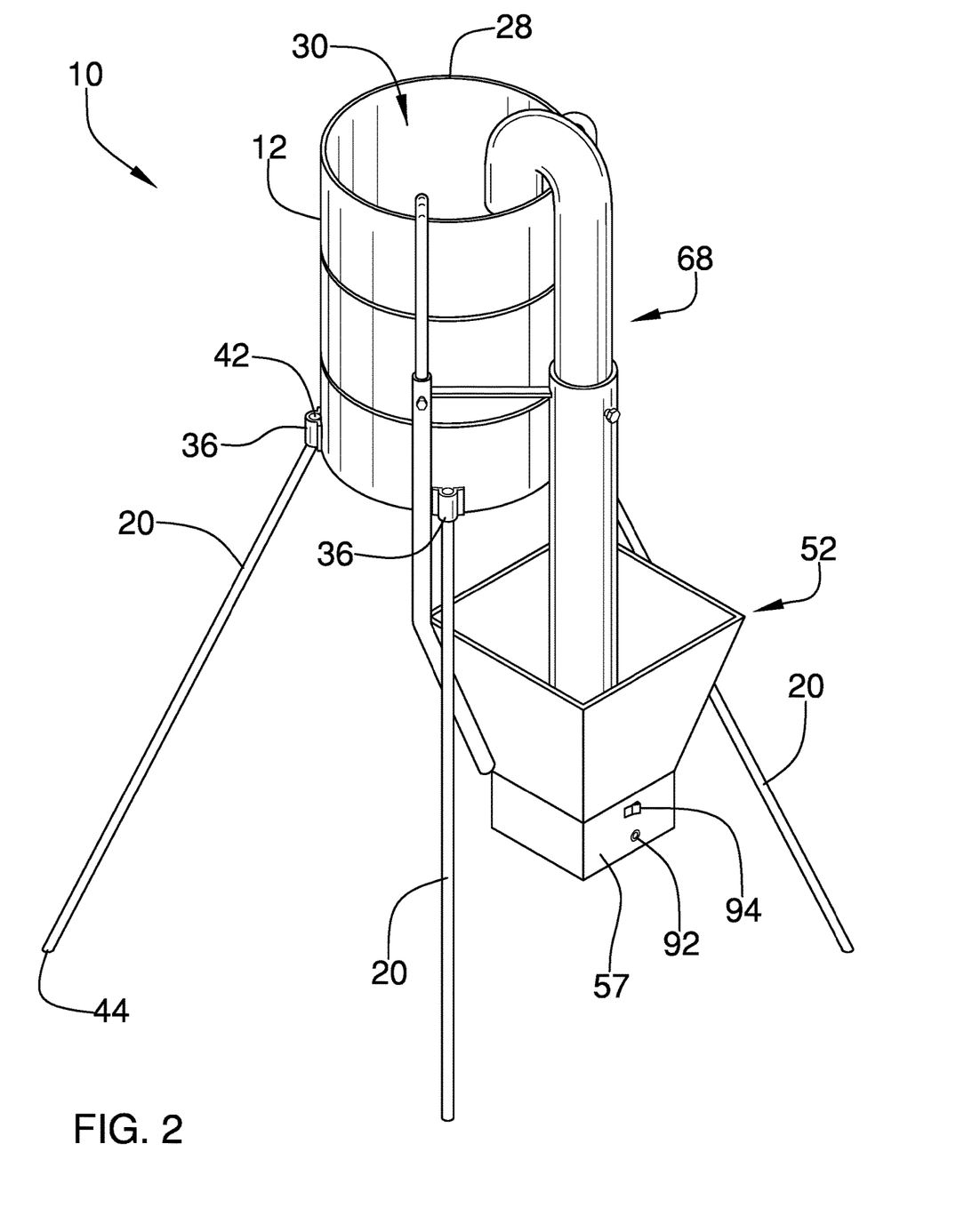
FIG. 2 is a front phantom view of an elevated animal feeder assembly according to an embodiment of the disclosure.
Figure 3:
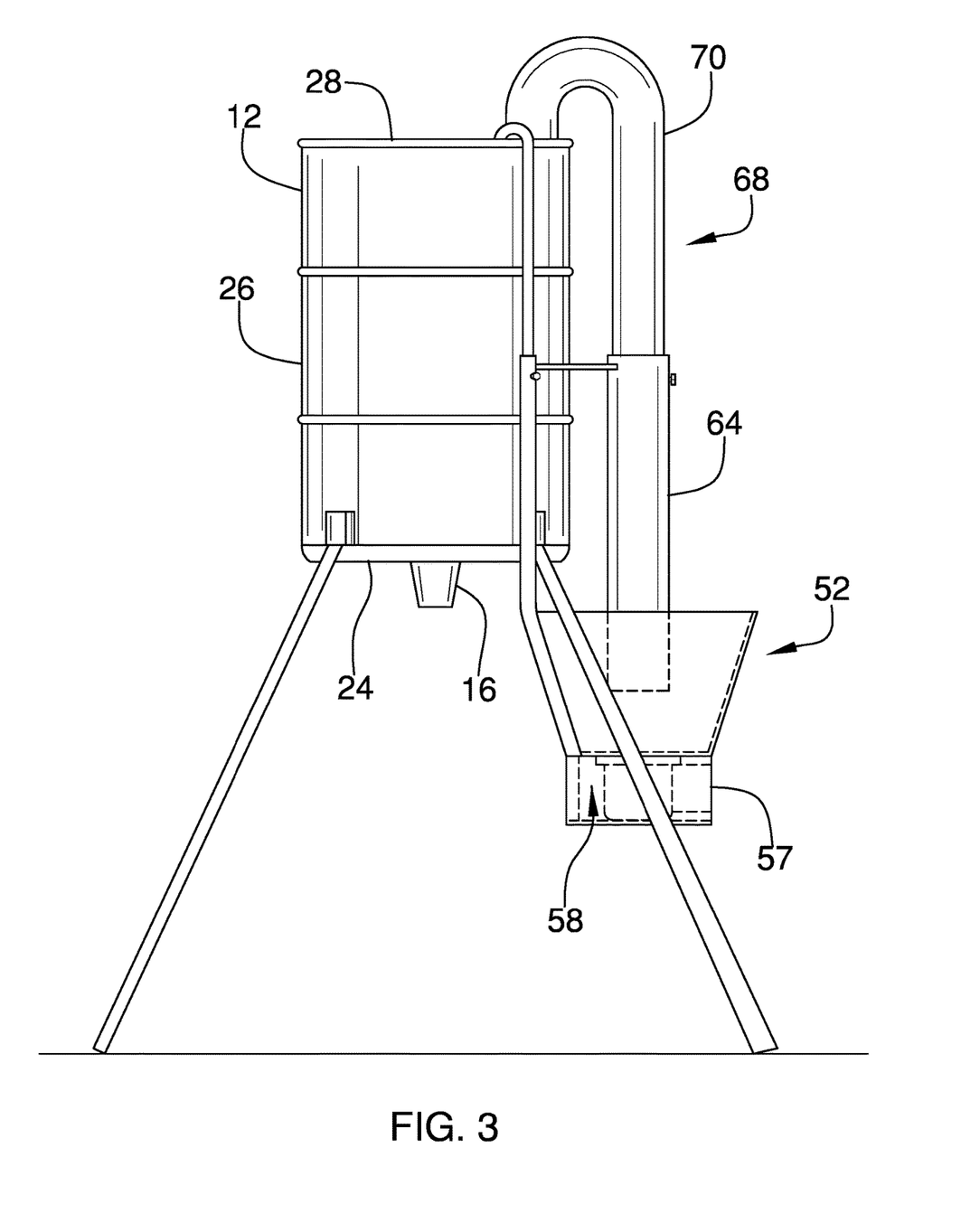
FIG. 3 is a right side phantom view of an embodiment of the disclosure.
Figure 4:
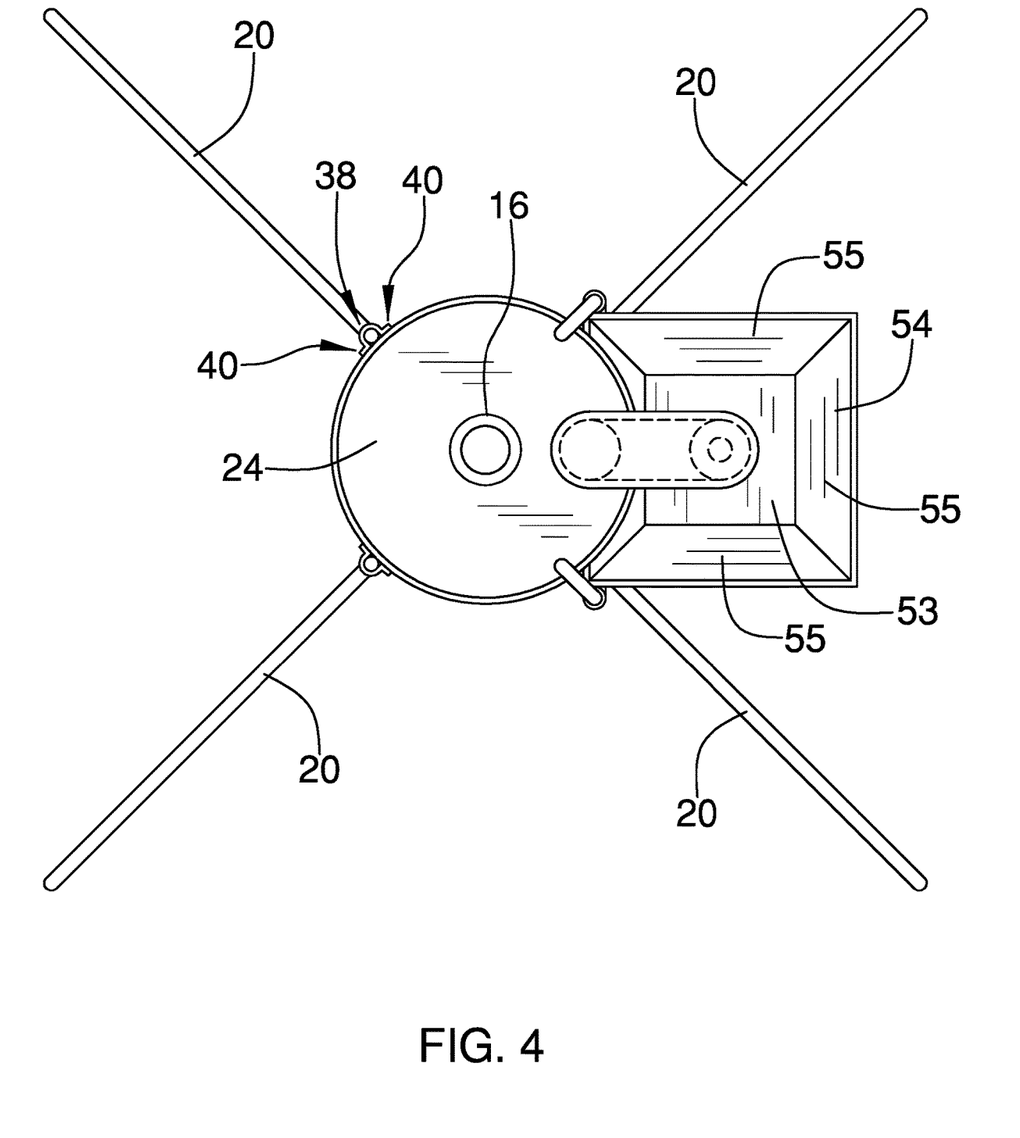
FIG. 4 is a top phantom view of an embodiment of the disclosure.
Figure 5:
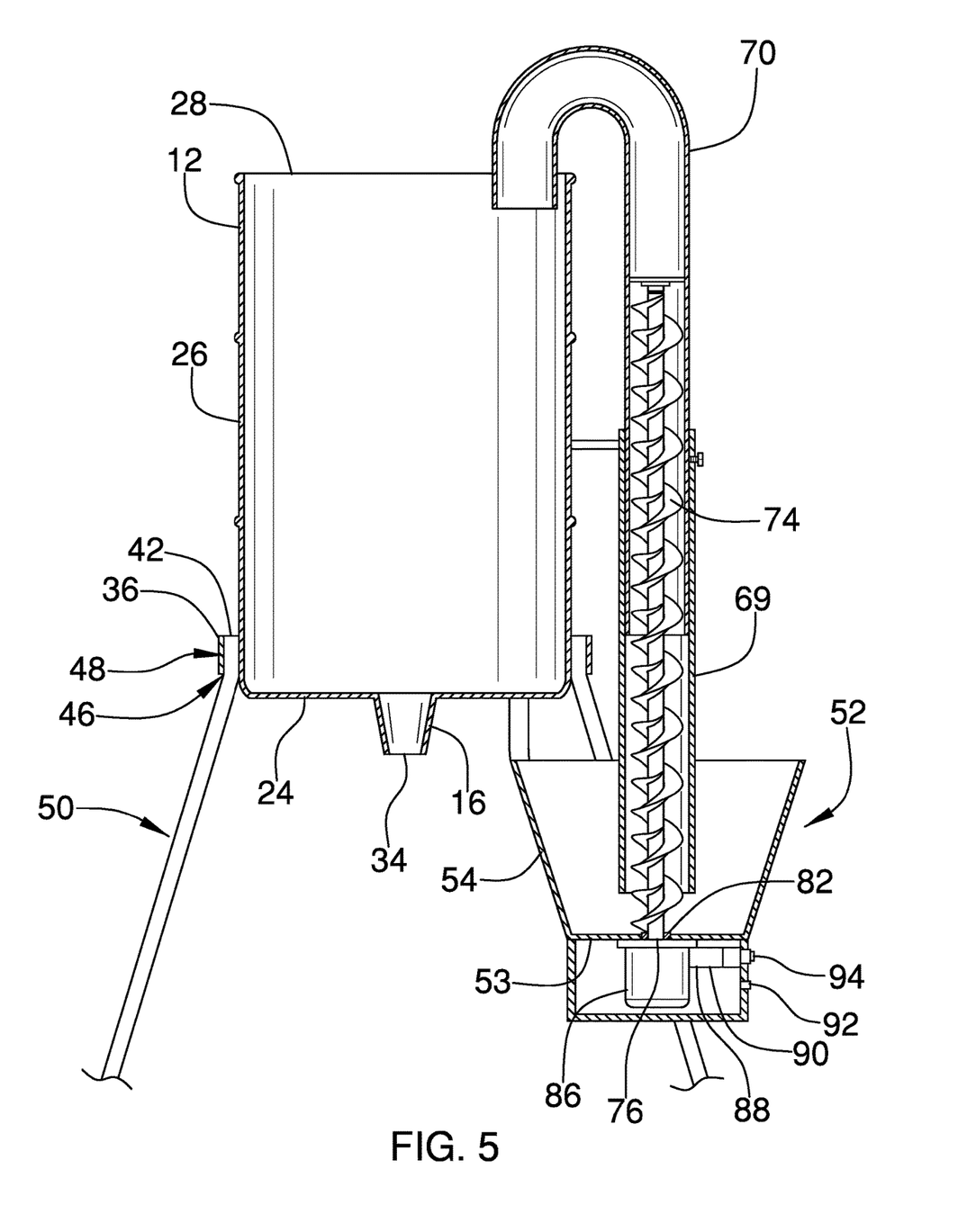
FIG. 5 is a right side cut-away view of an embodiment of the disclosure showing an auger within an auger chute.
Figure 6:
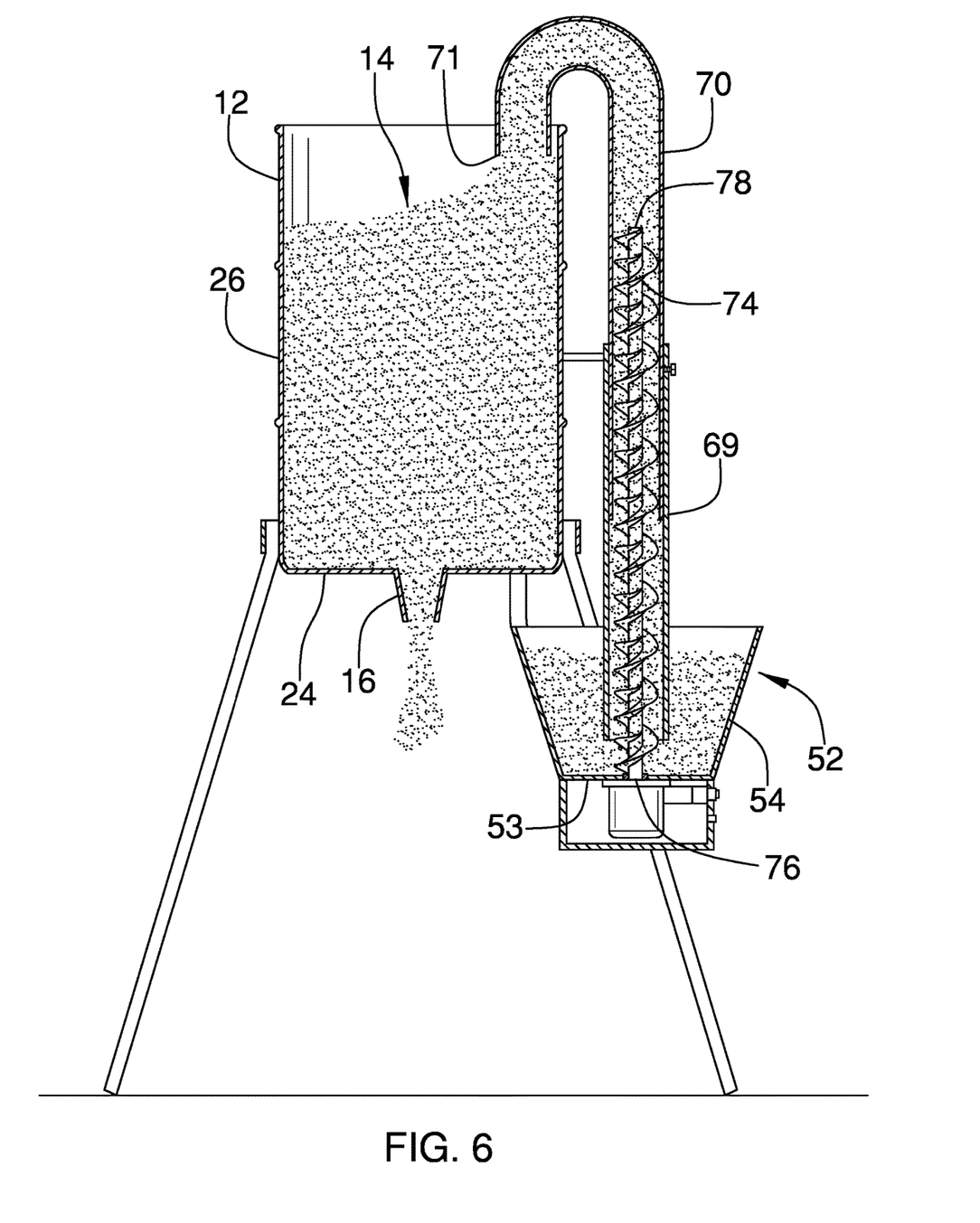
FIG. 6 is a right side cut-away view of an embodiment of the disclosure showing granular animal feed being transported between a feed bucket and a hopper.
Figure 7:
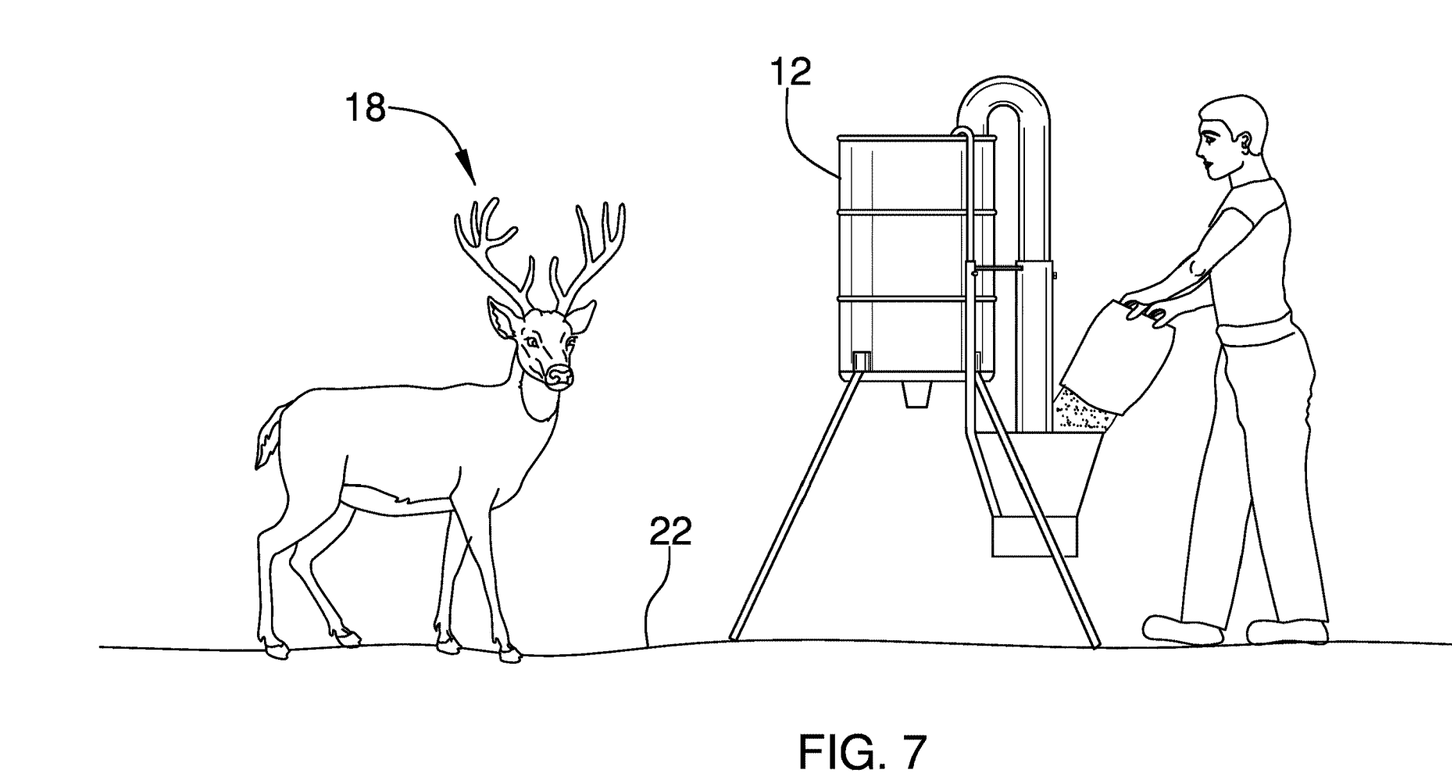
FIG. 7 is a perspective in-use view of an embodiment of the disclosure.

With reference now to the drawings, and in particular to FIGS. 1 through 7 thereof, a new animal feeder device embodying the principles and concepts of an embodiment of the disclosure and generally designated by the reference numeral 10 will be described.

As best illustrated in FIGS. 1 through 7, the elevated animal feeder assembly 10 generally comprises a hopper 12 for containing granular animal feed 14. The hopper 12 has a dispensing chute 16 for dispensing the granular animal feed 14 to feed an animal 18. The animal 18 may be large game, such a whitetail deer, for example, or other type of game animal that is commonly baited with an elevated food source. The hopper 12 includes a plurality of legs 20 for elevating the hopper 12 above a support surface 22 to facilitate the animal 18 to feed in a standing position.

The hopper 12 has a bottom wall 24 and an outer wall 26 extending upwardly from the bottom wall 24, and the outer wall 26 has a distal edge 28 with respect to the bottom wall 24 defining an opening 30 into the hopper 12. The dispensing chute 16 extends downwardly from the bottom wall 24 and the dispensing chute 16 is in fluid communication with the interior of the hopper 12. The dispensing chute 16 has a distal end 34 with respect to the bottom wall 24, the dispensing chute 16 tapers between the bottom wall 24 and the distal end 34 and the dispensing chute 16 is centrally positioned on the bottom wall 24.

The hopper 12 includes a plurality of receivers 36 that each comprises a sleeve portion 38 extending between a pair of tab portions 40. Each of the tab portions 40 of each of the receivers 36 is attached to the outer wall 26 of the hopper 12 such that the sleeve portion 38 of each of the receivers 36 curves outwardly from the outer wall 26. Each of the receivers 36 is positioned adjacent to the bottom wall 24 and the sleeve portion 38 of each of the receivers 36 extends along an axis extending between the bottom wall 24 and the distal edge 28 of the outer wall 26. Each of the legs 20 has a top end 42 and a bottom end 44, and each of the legs 20 has a bend 46 that is spaced from the top end 42 defining a first portion 48 of the legs 20 forming an angle with a second portion 50 of the legs 20. The first portion 48 of each of the legs 20 is slidable into the sleeve portion 38 of a respective one of the receivers 36 having the second portion 50 of each of the legs 20 angling outwardly from the hopper 12. In this way the legs 20 can stabilize the hopper 12 having the bottom end 44 of each of the legs 20 abutting a support surface 22 over which the hopper 12 is elevated. The support surface 22 may be ground or other horizontal support surface.

A feed bucket 52 is provided which is suspendable from the hopper 12 thereby facilitating the feed bucket 52 to be filled with the granular animal feed 14. In this way the feed bucket 52 facilitates a physically limited user to fill the feed bucket 52 without assistance. The feed bucket 52 has a basal wall 53 and a perimeter wall 54 extending upwardly from the basal wall 53 and the perimeter wall 54 angles outwardly from the basal wall 53. The perimeter wall 54 has a plurality of intersecting sides 55 such that the perimeter wall 54 defines a rectangular opening 56 into the feed bucket 52. The feed bucket 52 has a surround 57 that is coupled to and extends downwardly from the basal wall 53. Furthermore, the surround 57 extends around a full perimeter of the basal wall 53 to define a motor space 58 beneath the basal wall 53.

A pair of grapples 59 is each attached to the feed bucket 52 and each of the grapples 59 releasably engages the hopper 12. Each of the grapples 59 comprises a tube 60 that is coupled against a respective one of the intersecting sides 55 of the perimeter wall of the feed bucket 52 having the tube 60 extending upwardly beyond a distal edge 61 of the perimeter wall 54 of the feed bucket 52. The tube 60 has a top end 62 that is spaced from the distal edge 61 of the perimeter wall 54. Each of the grapples 59 includes a member 63 that is slidably disposed in the top end 62 of the tube 60 and the member 63 has a distal end 64 with respect to the top end 62. The member 63 is curved adjacent to the distal end 64 to define a hook 65 for engaging the distal edge 28 of the outer wall 26 of the hopper 12. Each of the grapples 59 includes a fastener 66 which extends through an outside wall 67 of the tube 60. The fastener 66 engages the member 63 when the fastener 66 is tightened for retaining the member 63 at a selected length with respect to the tube 60. Conversely, the fastener 66 disengages the member 63 when the fastener 66 is loosened to facilitate the member 63 to be adjusted in the member 63.

An auger chute 68 is disposed in the feed bucket 52, the auger chute 68 extends upwardly from the feed bucket 52 and the auger chute 68 extends into the hopper 12. The auger chute 68 has a primary section 69 slidably receiving a secondary section 70 and the secondary section 70 has a top end 71. The secondary section 70 is curved adjacent to the top end 71 such that the top end 71 of the secondary section 70 is directed toward the primary section 69. In this way the secondary section 70 curves downwardly over the outer wall 26 of the hopper 12.

An auger 74 is rotatably disposed within the auger chute 68 and the auger 74 rotates in a first direction when the auger 74 is actuated. The auger 74 transports the granular animal feed 14 upwardly through the auger chute 68 and into the hopper 12 for filling the hopper 12 with the granular animal feed 14 when the auger 74 rotates in the first direction. The auger 74 has a lower end 76 and an upper end 78, and the upper end 78 is positioned in the secondary section 70 of the auger chute 68. Additionally, the lower end 76 extends through the basal wall 53 of the feed bucket 52. As is most clearly shown in FIG. 4, a bearing 82 may be attached to the top wall 80 of the primary section 69 of the auger chute 68 to rotatably engage the upper end 78 of the auger 74.

A motor 86 is attached to a lower surface 87 of the basal wall 53 of the feed bucket 52 such that the motor 86 is positioned in the motor space 58 defined by the surround 57 on the feed bucket 52. The motor 86 engages the lower end 76 of the auger 74 and the motor 86 rotates the auger 74 in the first direction when the motor 86 is turned on. The motor 86 may comprise an electric motor or the like. A power supply 88 is disposed in the motor space 58 defined by the surround 57 on the feed bucket 52 and the power supply 88 is electrically coupled to the motor 86. The power supply 88 comprises a rechargeable battery 90 that is positioned in the motor space 58 and the rechargeable battery 90 is electrically coupled to the motor 86.

The power supply 88 includes a charging port 92 that is recessed into the surround 57 thereby facilitating the charging port 92 to insertably receive a charge cord. The charging port 92 is electrically coupled to the rechargeable battery 90 to charge the rechargeable battery 90. The power supply 88 includes a power switch 94 that is movably integrated into the surround 57. The power switch 94 is electrically coupled to the motor 86 and the power switch 94 turns the motor 86 on and off.

In use, each of the legs 20 is inserted into the respective receiver 36 to facilitate the hopper 12 to be elevated above the support surface 22. Each of the grapples 59 is suspended on the outer wall 26 of the hopper 12 such that the auger chute 68 curves downwardly into the hopper. The feed bucket 52 is filled with the granular animal feed 14 and the power switch 78 is manipulated to turn on the motor 86. Thus, the auger 74 is rotated to transport the granular animal feed 14 upwardly through the auger chute 68 and into the hopper 12. In this way the hopper 12 can be filled with the granular animal feed 14 without requiring the physically limited user to manually fill the hopper 12. The power switch 78 is manipulated to turn off the motor 86 when the hopper 12 is sufficiently filled with the granular animal feed 14. The dispensing chute 16 releases the granular animal feed 14 to facilitate the animal 18 to feed from the dispensing chute 16.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An elevated animal feeder assembly for facilitating a physically limited user to fill an elevated hopper with animal feed, said assembly comprising:
 a hopper for containing granular animal feed, said hopper having a dispensing chute for dispensing the granular animal feed wherein said hopper is configured to feed an animal, said hopper including a plurality of legs for elevating said hopper above a support surface wherein said hopper is configured to facilitate the animal to feed in a standing position;
 a feed bucket being suspendable from said hopper thereby facilitating said feed bucket to be filled with the granular animal feed wherein said feed bucket is configured to facilitate a physically limited user to fill said feed bucket without assistance;
 a pair of grapples, each of said grapples being attached to said feed bucket, each of said grapples releasably engaging said hopper;
 an auger chute being disposed in said feed bucket, said auger chute extending upwardly from said feed bucket, said auger chute extending into said hopper; and
 an auger being rotatably disposed within said auger chute, said auger rotating in a first direction when said auger is actuated, said auger transporting the granular animal feed upwardly through said auger chute and into said hopper for filling said hopper with the granular animal feed when said auger rotates in said first direction.

2. The assembly according to claim 1, wherein:
 said hopper has a bottom wall and an outer wall extending upwardly from said bottom wall, said outer wall having a distal edge with respect to said bottom wall defining an opening into said hopper, said outer wall having an auger opening extending into an interior of said hopper, said auger opening being positioned adjacent to said distal edge, said dispensing chute extending downwardly from said bottom wall, said dispensing chute being in fluid communication with said interior of said hopper, said dispensing chute having a distal end with respect to said bottom wall, said dispensing chute tapering between said bottom wall and said distal end, said dispensing chute being centrally positioned on said bottom wall;
 said hopper includes a plurality of receivers each comprising a sleeve portion extending between a pair of tab portions, each of said tab portions of each of said receivers being attached to said outer wall of said hopper such that said sleeve portion of each of said receivers curves outwardly from said outer wall, each of said receivers being positioned adjacent to said bottom wall, said sleeve portion of each of said receivers extending along an axis extending between said bottom wall and said distal edge of said outer wall; and
 each of said legs has a top end and a bottom end, each of said legs having a bend being spaced from said top end defining a first portion of said legs forming an angle with a second portion of said legs, said first portion of each of said legs being slidable into said sleeve portion of a respective one of said receivers having said second portion of each of said legs angling outwardly from said hopper thereby facilitating said legs to stabilize said hopper having said bottom end of each of said legs abutting a support surface over which said hopper is elevated.

3. The assembly according to claim 1, wherein said feed bucket has a basal wall and a perimeter wall extending upwardly from said basal wall, said perimeter wall angling outwardly from said basal wall, said auger chute extending into said feed bucket having said distal end of said secondary section of said auger chute being spaced from said basal wall of said feed bucket, said feed bucket having a surround being coupled to and extending downwardly from said basal wall, said surround extending around a full perimeter of said basal wall to define a motor space beneath said basal wall, a lower edge of said surround resting on the support surface.

4. The assembly according to claim 3, wherein:
 said hopper has an outer wall, said outer wall having a distal edge; and
 each of said grapples comprises:
  a tube being coupled against a respective one of said intersecting sides of said perimeter wall having said tube extending upwardly beyond a distal edge of said perimeter wall, said tube having a top end being spaced from said distal edge of said perimeter wall;
  a member being slidably disposed in said top end of said tube, said member having a distal end with respect to said top end, said member being curved adjacent to said distal end to define a hook for engaging said distal edge of said outer wall of said hopper; and
  a fastener extending through an outside wall of said tube, said fastener engaging said member when said fastener is tightened for retaining said member at a selected length with respect to said tube, said fastener disengaging said member when said fastener is loosened to facilitate said member to be adjusted in said member.

5. The assembly according to claim 4, wherein:
 said auger chute has a primary section insertably receiving a secondary section, said secondary section having a top end, said secondary section being curved adjacent to said top end such that said top end is directed toward said primary section thereby facilitating said secondary section to curve downwardly over said outer wall of said hopper; and said assembly includes a pair of braces, each of said braces being coupled to and extending laterally away from said primary section of said auger chute, each of said braces angling away from each other, a distal end of each of said braces being attached to said tube of a respective one of said grapples for retaining said primary section of said auger chute in a vertical orientation.

6. The assembly according to claim 5, wherein:
said feed bucket has a basal wall and a surround extending downwardly from said basal wall, said surround defining a motor space beneath said basal wall; and
said auger has a lower end and an upper end, said upper end being positioned in said secondary section of said auger chute, said lower end extending through said basal wall of said feed bucket.

7. The assembly according to claim 6, further comprising a motor being attached to a lower surface of said basal wall of said feed bucket such that said motor is positioned in said motor space defined by said surround on said feed bucket, said motor engaging said lower end of said auger, said motor rotating said auger in said first direction when said motor is turned on.

8. The assembly according to claim 7, further comprising a power supply being disposed in said motor space defined by said surround on said feed bucket, said power supply being electrically coupled to said motor, said power supply comprising:
   a rechargeable battery being positioned in said motor space, said rechargeable battery being electrically coupled to said motor;
   a charging port being recessed into said surround thereby facilitating said charging port to insertably receive a charge cord, said charging port being electrically coupled to said rechargeable battery; and
   a power switch being movably integrated into said surround, said power switch being electrically coupled to said motor, said power switch turning said motor on and off.

9. An elevated animal feeder assembly for facilitating a physically limited user to fill an elevated hopper with animal feed, said assembly comprising:
   a hopper for containing granular animal feed, said hopper having a dispensing chute for dispensing the granular animal feed wherein said hopper is configured to feed an animal, said hopper including a plurality of legs for elevating said hopper above a support surface wherein said hopper is configured to facilitate the animal to feed in a standing position, said hopper having a bottom wall and an outer wall extending upwardly from said bottom wall, said outer wall having a distal edge with respect to said bottom wall defining an opening into said hopper, said dispensing chute extending downwardly from said bottom wall, said dispensing chute being in fluid communication with said interior of said hopper, said dispensing chute having a distal end with respect to said bottom wall, said dispensing chute tapering between said bottom wall and said distal end, said dispensing chute being centrally positioned on said bottom wall, said hopper including a plurality of receivers each comprising a sleeve portion extending between a pair of tab portions, each of said tab portions of each of said receivers being attached to said outer wall of said hopper such that said sleeve portion of each of said receivers curves outwardly from said outer wall, each of said receivers being positioned adjacent to said bottom wall, said sleeve portion of each of said receivers extending along an axis extending between said bottom wall and said distal edge of said outer wall, each of said legs having a top end and a bottom end, each of said legs having a bend being spaced from said top end defining a first portion of said legs forming an angle with a second portion of said legs, said first portion of each of said legs being slidable into said sleeve portion of a respective one of said receivers having said second portion of each of said legs angling outwardly from said hopper thereby facilitating said legs to stabilize said hopper having said bottom end of each of said legs abutting a support surface over which said hopper is elevated;
   a feed bucket being suspendable from said hopper thereby facilitating said feed bucket to be filled with the granular animal feed wherein said feed bucket is configured to facilitate a physically limited user to fill said feed bucket without assistance, said feed bucket having a basal wall and a perimeter wall extending upwardly from said basal wall, said perimeter wall angling outwardly from said basal wall, said perimeter wall having a plurality of intersecting sides such that said perimeter wall defines a rectangular opening into said feed bucket, said feed bucket having a surround being coupled to and extending downwardly from said basal wall, said surround extending around a full perimeter of said basal wall to define a motor space beneath said basal wall;
   a pair of grapples, each of said grapples being attached to said feed bucket, each of said grapples releasably engaging said hopper, each of said grapples comprising:
      a tube being coupled against a respective one of said intersecting sides of said perimeter wall having said tube extending upwardly beyond a distal edge of said perimeter wall, said tube having a top end being spaced from said distal edge of said perimeter wall;
      a member being slidably disposed in said top end of said tube, said member having a distal end with respect to said top end, said member being curved adjacent to said distal end to define a hook for engaging said distal edge of said outer wall of said hopper; and
      a fastener extending through an outside wall of said tube, said fastener engaging said member when said fastener is tightened for retaining said member at a selected length with respect to said tube, said fastener disengaging said member when said fastener is loosened to facilitate said member to be adjusted in said member;
   an auger chute being disposed in said feed bucket, said auger chute extending upwardly from said feed bucket, said auger chute extending into said hopper, said auger chute having a primary section insertably receiving a secondary section, said secondary section having a top end, said secondary section being curved adjacent to said top end such that said top end is directed toward said primary section thereby facilitating said secondary section to curve downwardly over said outer wall of said hopper;
   a pair of braces, each of said braces being coupled to and extending laterally away from said primary section of said auger chute, each of said braces angling away from each other, a distal end of each of said braces being attached to said tube of a respective one of said grapples for retaining said primary section of said auger chute in a vertical orientation;

an auger being rotatably disposed within said auger chute, said auger rotating in a first direction when said auger is actuated, said auger transporting the granular animal feed upwardly through said auger chute and into said hopper for filling said hopper with the granular animal feed when said auger rotates in said first direction, said auger having a lower end and an upper end, said upper end being positioned in said secondary section of said auger chute, said lower end extending through said basal wall of said feed bucket;

a motor being attached to a lower surface of said basal wall of said feed bucket such that said motor is positioned in said motor space defined by said surround on said feed bucket, said motor engaging said lower end of said auger, said motor rotating said auger in said first direction when said motor is turned on; and a power supply being disposed in said motor space defined by said surround on said feed bucket, said power supply being electrically coupled to said motor, said power supply comprising:
- a rechargeable battery being positioned in said motor space, said rechargeable battery being electrically coupled to said motor;
- a charging port being recessed into said surround thereby facilitating said charging port to insertably receive a charge cord, said charging port being electrically coupled to said rechargeable battery; and
- a power switch being movably integrated into said surround, said power switch being electrically coupled to said motor, said power switch turning said motor on and off.

\* \* \* \* \*